(12) United States Patent
Kuntze

(10) Patent No.: US 10,189,337 B2
(45) Date of Patent: Jan. 29, 2019

(54) COMPOSITE LIFTGATE

(71) Applicant: Magna International Inc., Aurora (CA)

(72) Inventor: Christopher J. Kuntze, Clarkston, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 15/118,382

(22) PCT Filed: Feb. 11, 2015

(86) PCT No.: PCT/US2015/015438
§ 371 (c)(1),
(2) Date: Aug. 11, 2016

(87) PCT Pub. No.: WO2015/123312
PCT Pub. Date: Aug. 20, 2015

(65) Prior Publication Data
US 2017/0174056 A1    Jun. 22, 2017

Related U.S. Application Data

(60) Provisional application No. 61/938,291, filed on Feb. 11, 2014.

(51) Int. Cl.
*B60J 5/02* (2006.01)
*B60J 5/10* (2006.01)

(52) U.S. Cl.
CPC ..................... *B60J 5/107* (2013.01)

(58) Field of Classification Search
CPC .......... B60J 5/101; B60J 5/107; B60J 1/1884; E05Y 2900/546; E05Y 2201/246; B60S 1/583; E05F 15/63
USPC .............................. 296/146.8, 106, 146.6, 56
See application file for complete search history.

(56) References Cited

U.S. PATENT DOCUMENTS

2005/0202223 A1   9/2005   Harima et al.
2012/0306231 A1   12/2012  Ginestet et al.

FOREIGN PATENT DOCUMENTS

| CN | 201810163 U | 4/2011 |
| DE | 102008063654 A1 | 7/2010 |
| WO | 2009143627 A1 | 12/2009 |
| WO | 2013051352 A1 | 4/2013 |

*Primary Examiner* — Kiran B Patel
(74) *Attorney, Agent, or Firm* — Warn Partners, P.C.

(57) ABSTRACT

A composite liftgate including an inner panel construction having strengthening channel structure in combination with a ribbing. Structural steel reinforcements are bonded to the inner panel where additional strength is needed. Where the extra structure is needed, a minimum amount of steel is used and the structural reinforcement is bonded in place using adhesive. A plurality of access doors are provided that are removable for easier maintenance and repair.

10 Claims, 7 Drawing Sheets

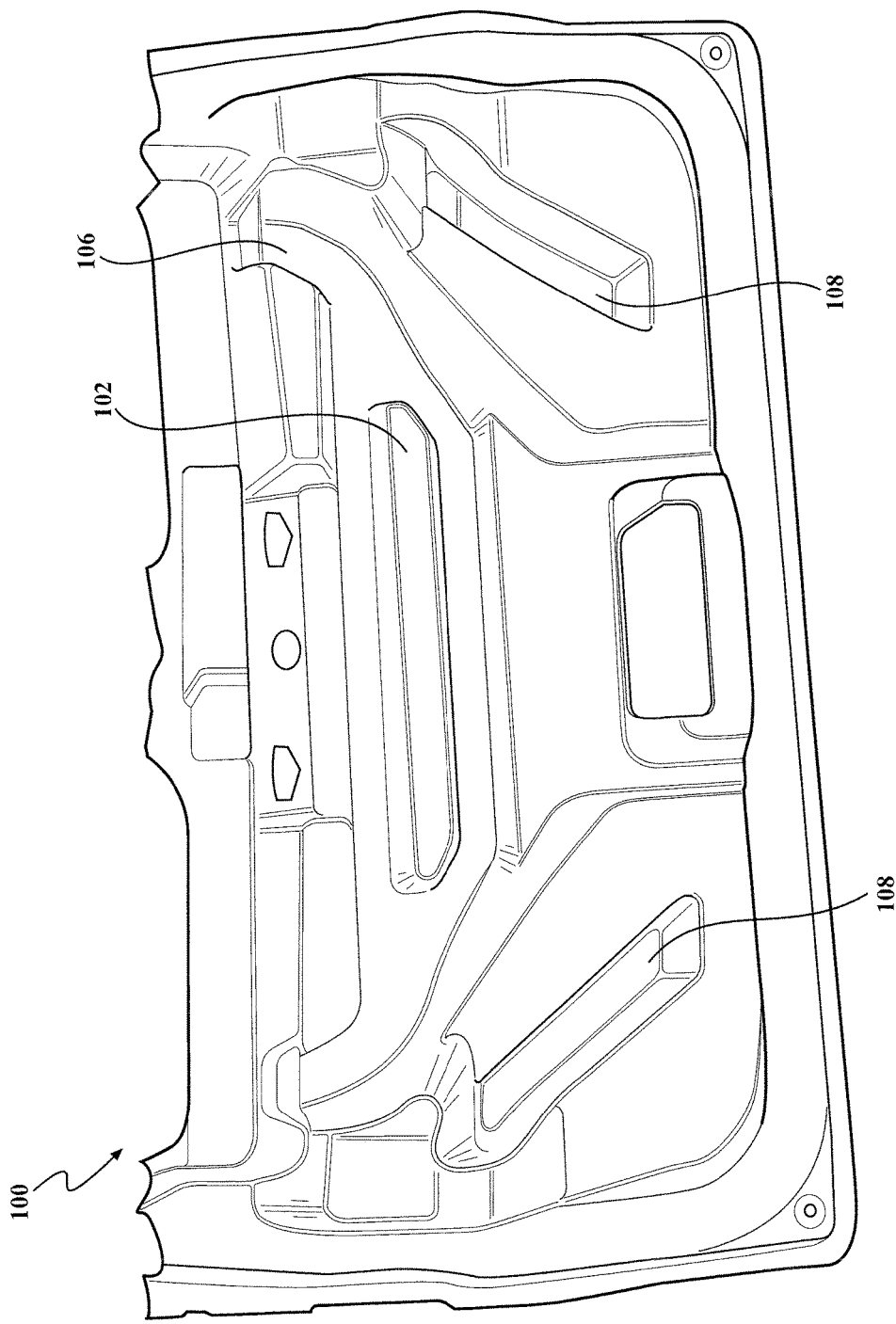

COMPOSITE LIFTGATE

CROSS-REFERENCE TO RELATED APPLICATIONS

This application is a National Stage of International Application No. PCT/US2015/015438, filed Feb. 11, 2015, which claims priority to U.S. Provisional Patent Application No. 61/938,291 filed Feb. 11, 2014. The disclosures of the above applications are incorporated herein by reference.

FIELD OF THE INVENTION

The present invention relates to liftgate systems for automobiles. More specifically, to a composite liftgate and method of manufacture.

BACKGROUND OF THE INVENTION

One of the current trends in the automobile industry is to lower vehicle weight to help achieve better fuel economy, thus helping to meet fuel economy standards and to offset the higher fuel prices. Another trend is that there is a broader range of vehicle models, which in turn reduces the volume of vehicles produced on a per model basis. Sport utility and crossover vehicles remain popular and typically include fairly heavy rear liftgates making this part of the vehicle a target area for weight reduction. Liftgates are traditionally made from stamped steel panels that are heavy and have a high tooling cost. Traditional steel liftgates are expensive investments, heavy, take up a lot of OEM floor space in areas from stamping plant, body shop, paint shop, and trim line. Further, steel liftgates have limited styling flexibility, take a lot of time to tool, and have corrosion concerns. Sheet Molding Compound (SMC) is an alternative to steel for the inner and outer panels of the liftgate. Using SMC has several manufacturing concerns related to the material and process. Steel and SMC liftgates have a mass penalty over thermoplastics. There are also styling restrictions with traditional sheet metal components. Thermoplastic composite type materials used for liftgate applications also have difficulty meeting customer performance specifications.

Another concern with the manufacture of liftgates is that typical liftgates are manufactured as a relatively flat or smoothly contoured panel, with structural reinforcements such as ribs added onto the panel. This will also add weight and increase manufacturing complexity as well and when thermoplastics are used there are read through areas where the ribs are placed which must be dealt with by design modifications or expensive processes such as gas assist injection molding. Ribs are also weaker and do not carry the load through the liftgate panel. Recently magnesium inner reinforcement panels have been used with an outer polymer skin in order to reduce weight. While such panels are an improvement in weight, this is an expensive solution. Another concern with typical liftgates is that the structural reinforcements are steel or larger steel structures adding weight and increased manufacturing complexity. Furthermore, as the liftgate environment is decreased a more effective steel reinforcement in the structural areas requiring extra strength is needed for maintaining strength. Another concern is typically reinforcement material is used for reinforcement in the structural areas and attachment structures are fixed using bolts. However, the use of bolts does not provide a continuous attachment structure and improved strength since there is distance between the bolts. Yet another concern with the manufacture of liftgates is that typical liftgates are manufactured as relatively solid with no access features such as access doors added into the panel to allow for easy access for general maintenance and repair of built in components.

A known 2008 Nissan Murano composite liftgate system helped to satisfy the weight savings and the tooling cost concerns, but utilized a typical bolt in small steel reinforcement at the latch which secures one end of the liftgate to the vehicle. This does not meet the higher load requirements desired in some applications, such as the latch pull test. A known Nissan Rogue composite liftgate system utilizes a steel one-piece outer panel and steel brackets. This does not improve density, painting efficiency, hold tighter tolerances, is more expensive and complex to manufacture, and adds weight to the liftgate/vehicle.

Accordingly, there exists a need for a composite liftgate which is both lightweight, as well as structurally sound to meet various load requirements, while being more mass and cost effective.

SUMMARY OF THE INVENTION

In accordance with the present invention, there is provided a composite liftgate system with an inner panel construction formed using an injection molding process with mold-in color, and grain in some areas, and including a strengthening channel structure in combination with ribbing. A plurality of structural steel reinforcements are bonded to the inner panel using adhesive where extra structure is needed. These steel reinforcements are minimized in size and are bonded, and preferably additionally bolted, to hold the steel reinforcements in position. A trim panel and outer panel are operably coupled to the inner panel. A plurality of removable access panels or doors are provided, including at least one access door in the trim panel.

The present invention provides extra strength when compared to steel liftgates while reducing overall weight by several pounds. Furthermore, as liftgate environment benchmarks are reduced the more structural reinforcement of the present invention effectively maintains strength to meet predetermined load requirements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5B is a rear perspective view of FIG. 5A, in accordance with the present invention;

DETAILED DESCRIPTION OF THE PREFERRED EMBODIMENTS

Figure 1:
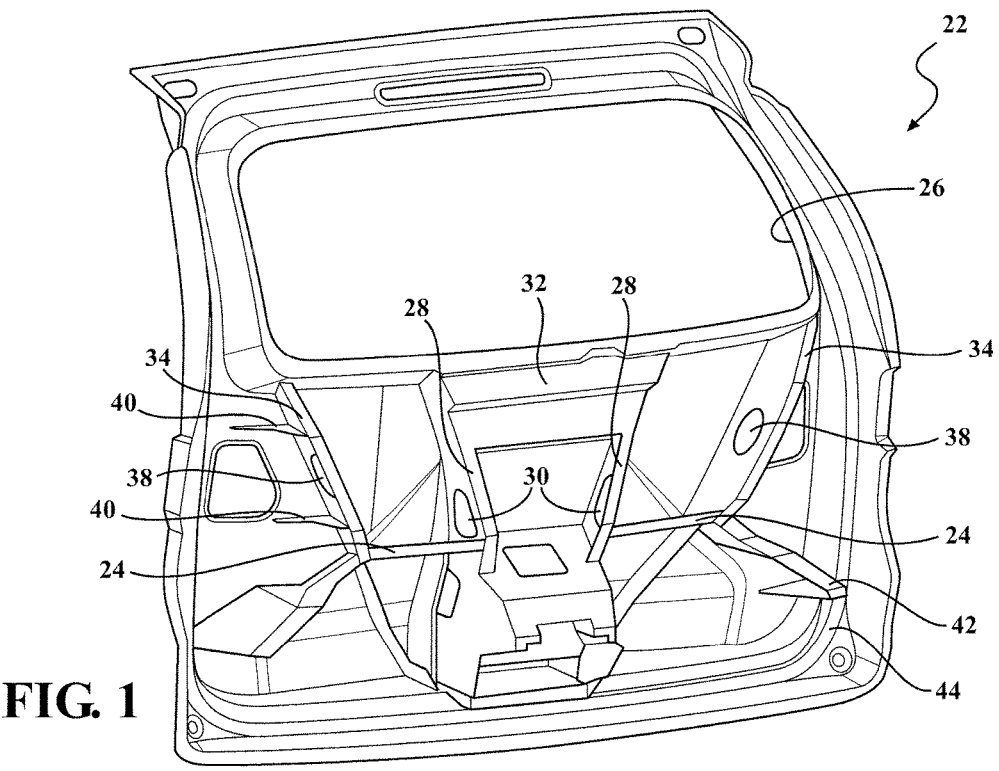
FIG. 1 is a front perspective view of an inner panel sub-assembly with structural reinforcements for a liftgate system, in accordance with the present invention
Figure 2:
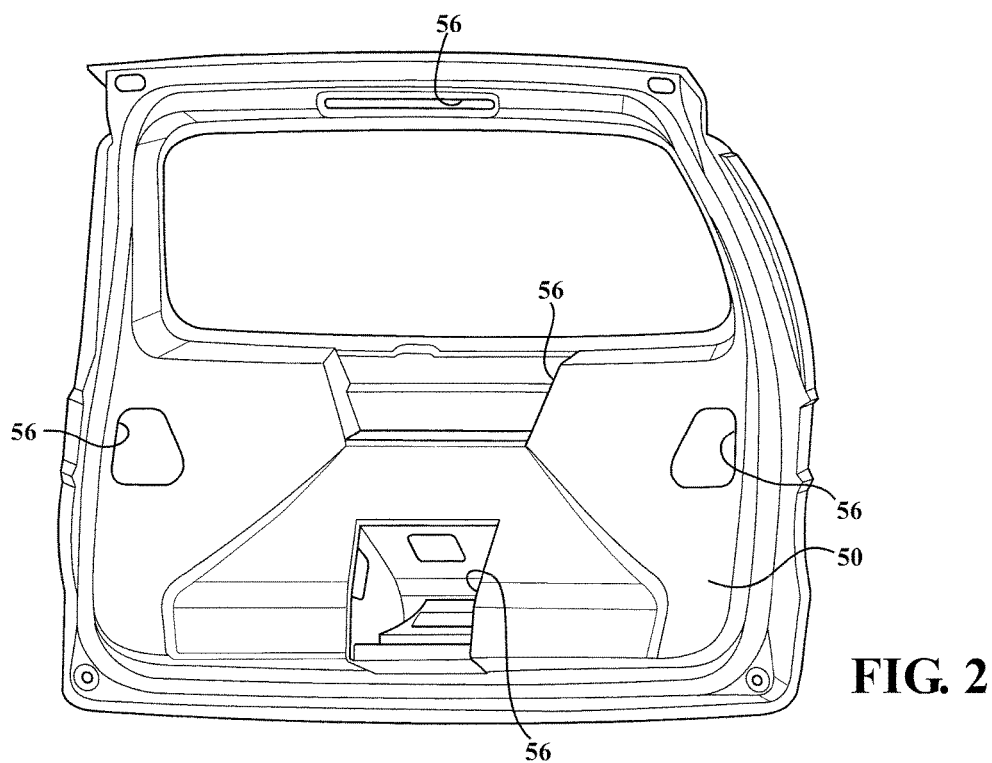
FIG. 2 is a rear perspective view of a trim panel connected to the inner panel for the composite liftgate assembly, in accordance with the present invention.
Figure 3:
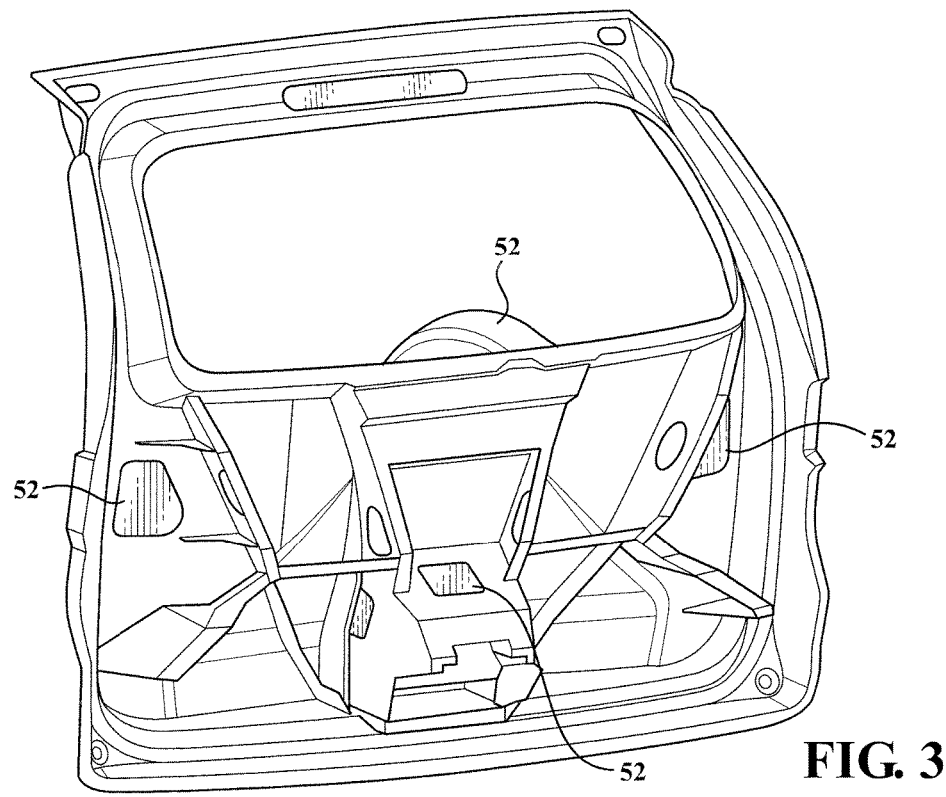
FIG. 3 is a front perspective view of the inner panel and further depicting rear surfaces of a plurality of access panels connected to the inner panel, in accordance with the present invention.
Figure 4:
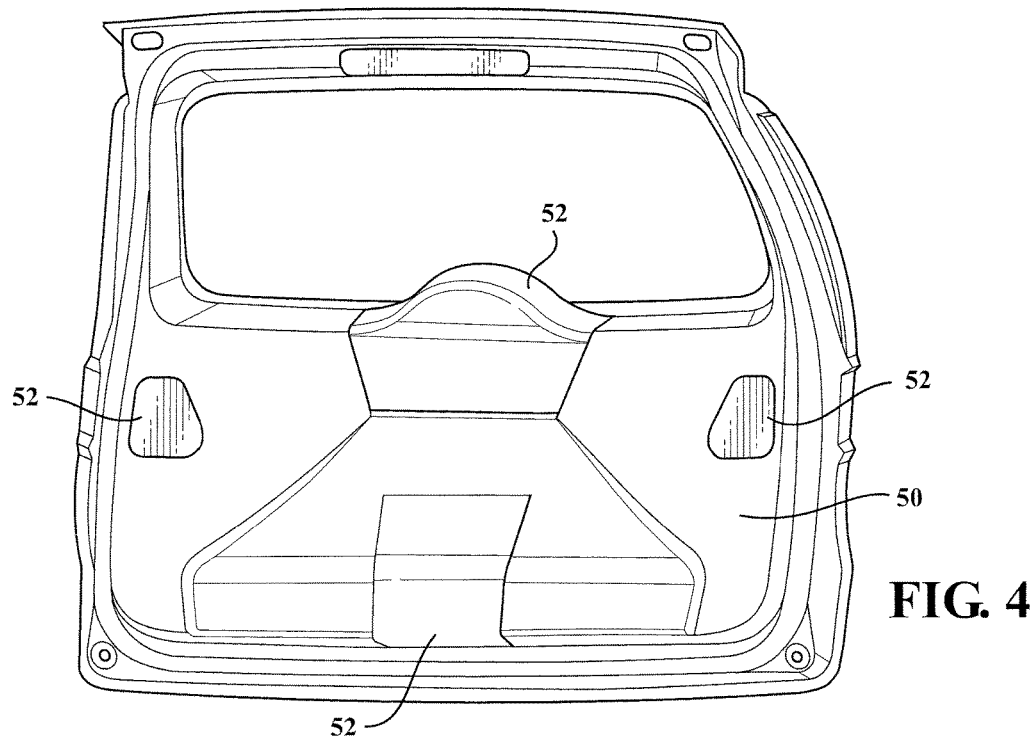
FIG. 4 is a rear perspective view of the inner panel with the trim panel and depicting front surfaces of the plurality of access panels, in accordance with the present invention.

The following description of the preferred embodiment(s) is merely exemplary in nature and is in no way intended to limit the invention, its application, or uses.

Referring to the figures generally, there is provided a composite liftgate assembly with bonded steel reinforcements. At least one structural channel molded into an inner panel of the liftgate in combination with formed ribbing further add structure where needed and manage the main loading paths as the liftgate is utilized in the various load cases. The steel reinforcements structurally bonded in place add structure where needed. Bonding through the use of adhesive provides a more continuous attachment structure and improved strength over bolting alone. The features and process of manufacture of the present invention achieves desired predetermined reduced weight targets, while keeping costs at target levels. In addition, the composite liftgate has several business case advantages for supplying a module, and reducing assembly plant complexity and improving throughput. Additionally, the present invention improves styling options and flexibility when compared to sheet metal liftgates. Corrosion and durability are also improved, e.g., improved over liftgates having a steel inner panel.

An embodiment of a composite liftgate system is shown in the Figures generally at 10. The liftgate 10 includes an outer panel 12 formed of an upper outer panel, shown generally at 14, and a lower outer panel, shown generally at 16. The upper outer panel 14 includes a center high-mount stop light (CHMSL). Optionally, a spoiler 18 is incorporated into the upper outer panel 14. A glass window 20 or rear window liftgate of the tailgate 10 is adhered to the upper and lower outer panels 14,16 and to an inner panel, shown generally at 22, with suitable adhesive. The upper outer panel 14 and separate lower panel 16 thereby form a two-piece outer panel. This has significant benefits and superior results over having a one-piece panel (especially over one that is also steel or not bonded in place), including, but not limited to, improved density, more efficient painting, tighter tolerances, less manufacturing issues, and more cost effectiveness. Alternatively, the outer panel 12 may be formed as a single piece.

Incorporating the spoiler 18 with the upper outer panel 14 has significant benefits and superior results over having a separate spoiler, including, but not limited to, optimized structure and strength and efficient processing.

The inner panel 22 is formed with at least one structural channel molded into the inner panel 22 in combination with a plurality of structural reinforcements such as ribs to manage the loading paths as the liftgate is utilized in various load cases. The channel pattern and ribbing of the present invention provides more structural shape where needed and allows for carrying the full thickness and load through the part, whereas ribbing alone is weaker and will not. The at least one channel in combination with the ribs have significant benefits and superior results over ribbing alone.

Molded into the inner panel 22 are at least one first pair of reinforcement ribs 24 that run horizontally, substantially parallel to and below a viewing opening 26 formed in the inner panel 22. The first pair of reinforcement ribs 24 are substantially centrally located in the portion of the inner panel 22 below the opening 26 and both channels of the pair extend along the same horizontal plane and are spaced a predetermined distance apart. The first pair of reinforcement ribs 24 extend outward generally toward the rear of the vehicle.

Molded into the inner panel 22 are at least one second pair of reinforcement ribs 28. The first pair of reinforcement ribs 24 terminate at the second pair of channels 30. The second pair of reinforcement ribs 28 run in a diagonal pattern at a predetermined angle, substantially in diagonal directions away from each other with the largest distance apart being toward the opening 26. The second pair of reinforcement ribs 28 extend outward generally toward the rear of the vehicle. At least one opening 30 is formed in each rib of the second pair of reinforcement ribs 28 suitably sized to decrease use of material and thereby weight without sacrificing strength.

Formed with the second pair of reinforcement ribs 28 is at least one stepped channel portion 32 that runs horizontally, substantially parallel to and adjacent the opening 26 formed in the inner panel 22.

A third pair of reinforcement ribs 34 run in a substantially diagonal pattern from near the lower corner forming the opening 26 and/or near a gas strut reinforcement 36 attachment region downward to intersect the first pair of reinforcement ribs 28. At least one opening 38 is formed in each rib of the third pair of reinforcement ribs 34 suitably sized to decrease use of material and thereby weight without sacrificing strength.

Each of the pairs of reinforcement ribs and the at least one stepped channel portion 24, 28, 32, 34 have predetermined lengths, widths, heights, and material thickness suitable to provide structural support and strength for the inner panel 22, including under predetermined load conditions. Optionally, additional ribs and/or channels can be formed as part of the inner panel 22.

Formed as part of the inner panel 22 are additional structural reinforcements members or ribs 40. At least one first set of ribs 40 are connected to the outward sidewall of the third pair of reinforcement ribs 34. At least one additional rib 42 is formed as part of the inner panel 22 and intersects near the lower corner of a rim or ring 44 formed in the inner panel 22. Optionally, additional ribs can be formed as part of the inner panel 22.

Figure 10:
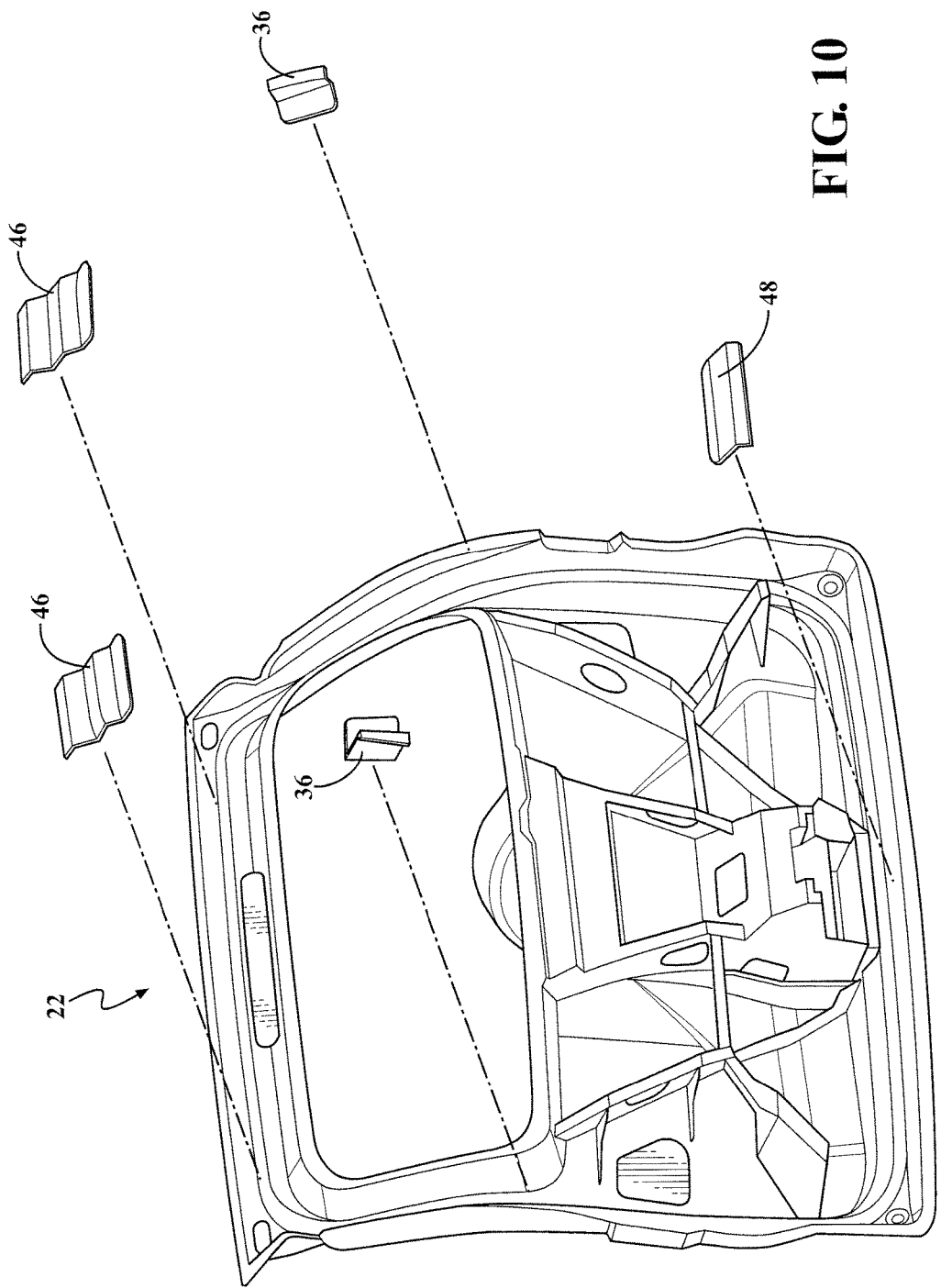
FIG. 10 is an partially exploded view of the inner panel with a gas strut reinforcement, hinge reinforcement and latch reinforcement and further depicting rear surfaces of a plurality of access panels connected to the inner panel, in accordance with the present invention.

A pair of gas strut reinforcements 36 or brackets, preferably formed of steel, and ball are bonded to the inner panel 22 using adhesive (see FIG. 10). Preferably, a first plurality of fasteners, e.g., push nuts, screws, are added to further hold the gas strut reinforcements 36 in position. It is within the scope of the invention that the gas strut reinforcements 36 could be insert molded to connect the gas strut reinforcements 36 to the inner panel 22.

A pair of hinge reinforcements 46 or brackets, preferably formed of steel, are bonded to the inner panel 22 using adhesive. Preferably, a second plurality of fasteners e.g., push nuts, screws, are added to further hold the hinge reinforcements 46 in position.

Each of the gas strut reinforcements 36 are preferably coupled to a gas strut and the hinge reinforcements are preferably coupled to a hinge system, with the hinge system and gas strut connected to a vehicle.

At least one latch reinforcement 48 or bracket, preferably formed of steel, is bonded to the inner panel 22 using adhesive. Preferably, a third plurality of fasteners e.g., push nuts, screws, are added to further hold the latch reinforcement 48 in position.

The present invention provides more ribs and lifters, which tends to increase the complexity of tooling, however, the cost effectiveness is increased, e.g., because the trim panel is minimized and/or eliminated.

Referring to the figures generally, the inner panel 22 is reinforced locally in areas where extra structure is needed. As the benchmark liftgate environments are made smaller, this drives the use of steel reinforcements in the D-Pillar to maintain strength. There is provided a plurality of steel reinforcements to add structure where needed to reinforce areas such as the D-pillar. The steel reinforcements are sized optimally to keep weight down while providing added strength and structure. One of the ways this is achieved is by bonding the steel reinforcement to provide a continuous attachment structure and improved strength. The bonding saves weight and provides more structural stiffness and strength.

The inner panel 22 is bonded to the glass pane 20 and reinforcement bracket 36 through the use of adhesive 58 such that predetermined operable cross section(s) for packaging for wiring, e.g., the main wiring harness 60, and an adjacent gas strut 62 is provided. The reinforcement is thin having a predetermined thickness and is bonded, rather than just bolting in a few locations, with structural adhesive to bond in place with continuous attachment of the structure. Bonding saves weight and additionally provides more structural stiffness and strength. The inner panel adhered to the brackets and outer panel forms predetermined operable cross sections.

The plurality of steel reinforcements are coupled to the inner panel 22 by bonding using adhesive such that the steel reinforcements are structurally bonded in place to add the structure where needed. Most preferably, the adhesive is a structural two-part urethane adhesive. The bonding with the use of adhesives has significant benefits and superior results over steel reinforcements connected to the inner panel by bolts. Optionally, the steel reinforcements can additionally be bolted.

Connected to the inner panel 22 is a trim panel 50 substantially facing toward the vehicle interior and running generally from at least the D-pillar to near the bottom edge of the inner panel 22. The lower trim panel has class A surfaces and at least one access panel 52 or door. The trim panel 50 typically has a plurality of openings 56 each respectively covered by an access doors 52.

Preferably, a plurality of access panels 52 are provided and coupled to at least the trim panel 50 and, optionally, also the inner panel 22. The plurality of access panels 52 are removable for gaining access for maintenance and repair. The access panels 52 are a significant benefit over conventional liftgates requiring disassembly and maintenance/repair complexity. Most preferably, there are at least five access panels 52 suitably situated where maintenance and repair of components not otherwise easily accessible is desired, e.g., at least one access panel 52 is located in each of the following areas: the latch mechanism assembly generally adjacent the latch reinforcement 48, two locations in the tail light assembly 54 (e.g., for changing burnt out tail lights), CHMSL area of the upper outer panel 14, and wiper assembly areas (e.g., to access a wiper motor).

Optionally, an internal cable reinforcement is provided in the liftgate assembly 10 to assist in maintaining the liftgate assembly in position. The internal cable reinforcement goes from near the hinge reinforcement 46 to near the gas strut reinforcement 36 down to near the latch reinforcement 48, then across the wiper area typically near the top edge of the opening 26 and down to the other side. The cable is stainless steel with a thermoplastic elastomer (TPE) outer coating. Alternatively, the cable is a braided cable of glass fiber rope and/or glass/Kevlar rope. In one embodiment the cable is single layer with one sided sticky affixed from the hinge area down to the latch area and back up to the hinge area of the other side.

Figure 7:
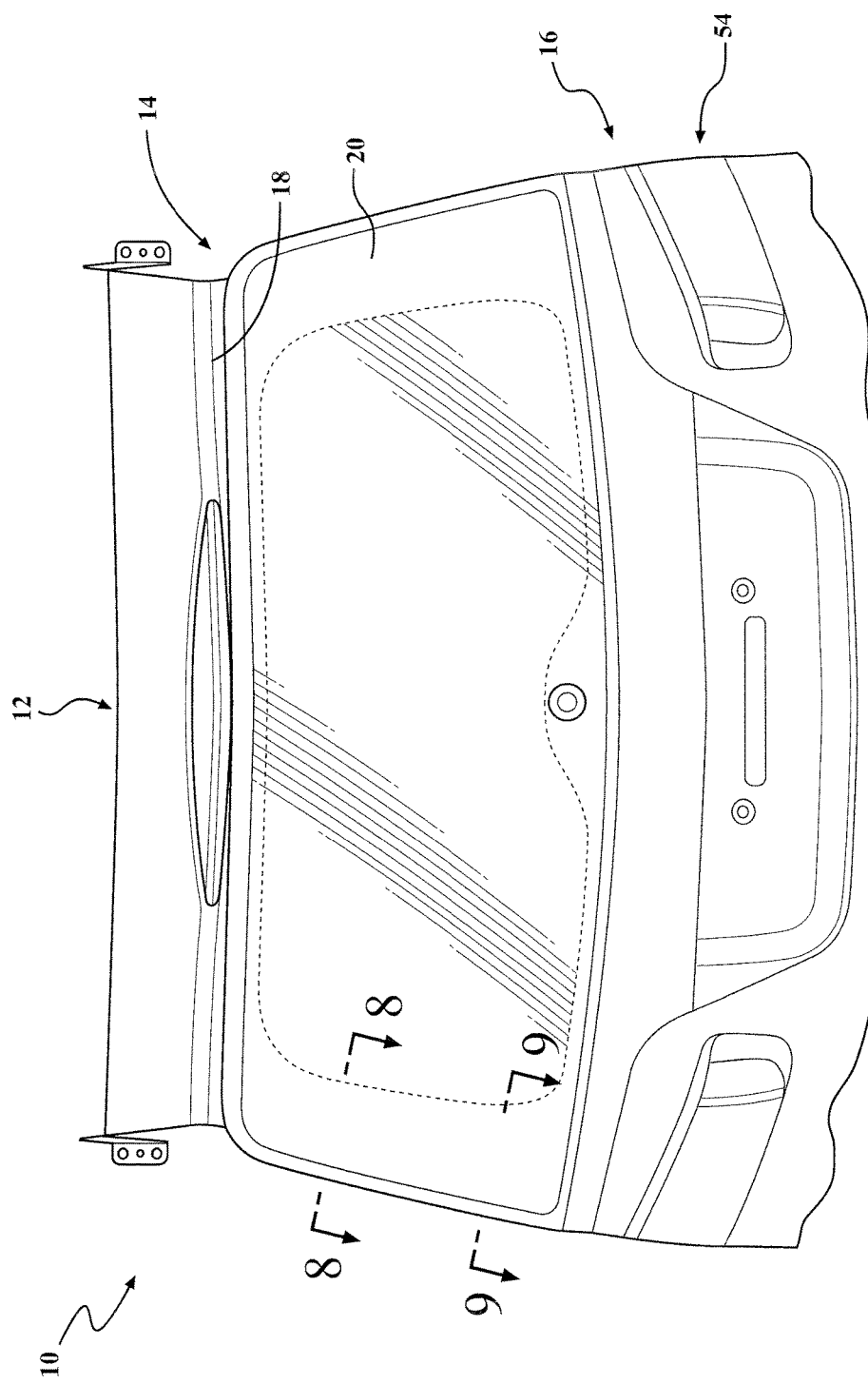
FIG. 7 is a front perspective view of an outer panel connected to the inner panel for the composite liftgate assembly, in accordance with the present invention.
Figure 8:
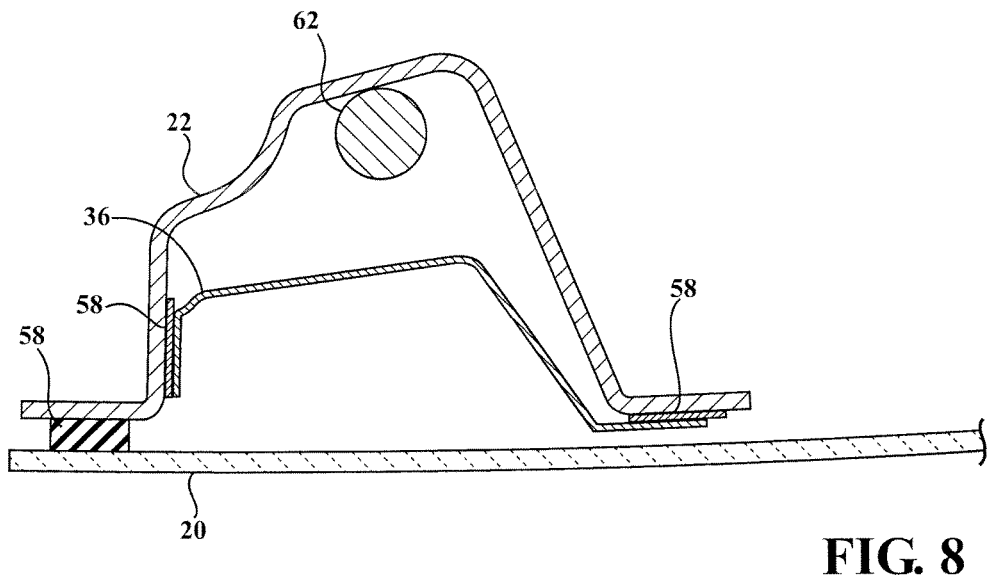
FIG. 8 is a cross-section taken along 8-8 of FIG. 7, in accordance with the present invention.
Figure 9:
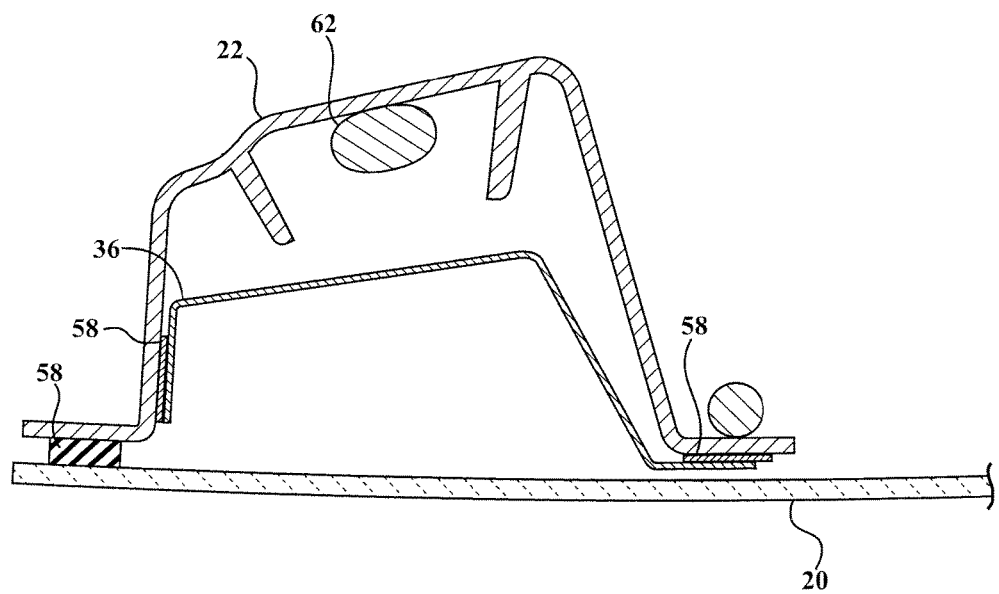
FIG. 9 is a cross-section taken along 9-9 of FIG. 7, in accordance with the present invention.

The inner panel 22 is typically thermoplastic injection molded with mold-in color, and grain in areas of class A surface(s). Thereafter, the inner panel 22 is painted and bonded with structural steel reinforcements and outer panel 12 and the trim panel 50. Most preferably, the inner panel 22 is thermoplastic 0.5 inch long glass filament filled polypropylene. The injection molding processing in accordance with the present invention is operable to ensure filling, melt front welding and fiber orientation optimization. The upper outer panel 14 and lower outer panel 16 are painted prior to connecting to the inner panel 22. Referring more particularly to FIG. 7, the outer panel 12 is bonded to the inner panel 22 by using adhesive applied in a predetermined pattern on the inner panel 22 generally near the perimeter of the inner panel 22 and substantially horizontally across predetermined areas of the inner panel 22. There is also provided a main wiring harness coupled to the inner panel 22. A tail light assembly 54 is formed as a single piece with the lower outer panel 16, or may be formed as a separate piece then connected to the lower outer panel 16 with adhesive and/or fasteners. The glass pane 20 is bonded to the inner panel 22 and outer panel 12 using at least adhesive. The adhesive is preferably applied in a continuous loop such that the glass 20 is bonded without any adhesive gaps around the glass 20.

By non-limiting example, the inner panel 22 is bonded to the outer panel 12 to using urethane bonding. The inner panel 22 provides structural support for the composite liftgate of the present invention not only through the shape of the inner panel as described above, but the material used to make the inner panel provides structural support as well. The inner panel 22 is made of a structural thermoplastic, such as a polypropylene, a thermoset or thermoplastic such as a reinforced polypropylene (RPP), and is preferably glass-filled polypropylene, most preferably, a 40% glass-filled polypropylene. The inner panel 22 is preferably thermoplastic 0.5 inch long glass filament filled polypropylene. By way of non-limiting example, the outer panel 12 is made of a suitable thermoplastic used as a show surface, such as a thermoplastic polyolefin (TPO). The structural composite reinforcements preferably comprise woven glass reinforcement.

Figure 5A:
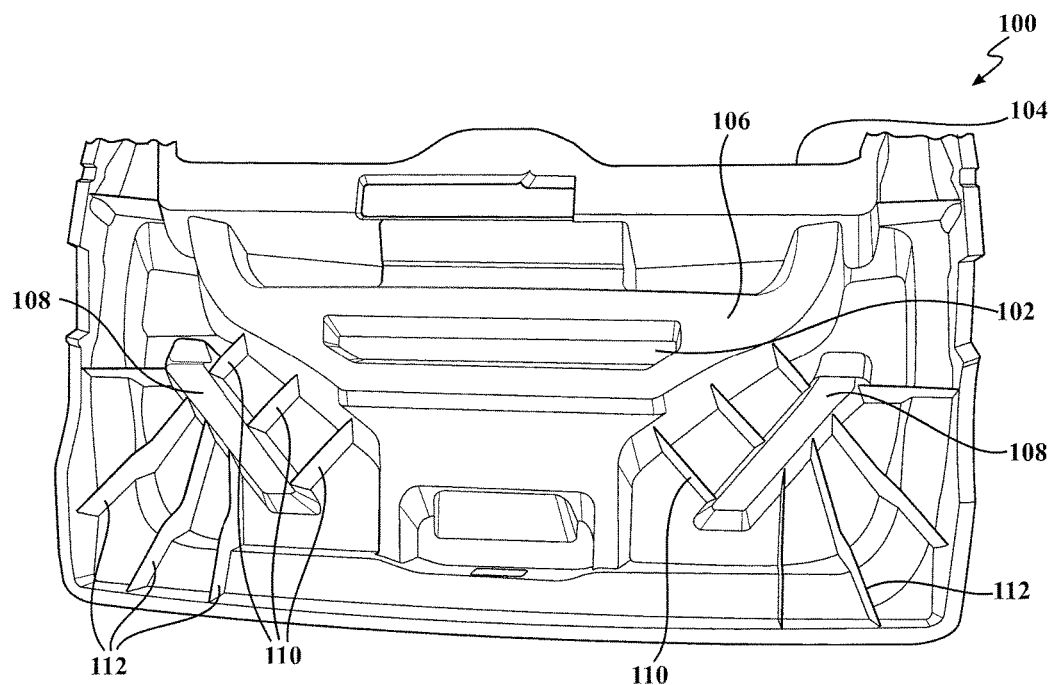
FIG. 5A is a front perspective view of an alternative inner panel with structural reinforcements, in accordance with the present invention.
Figure 6:
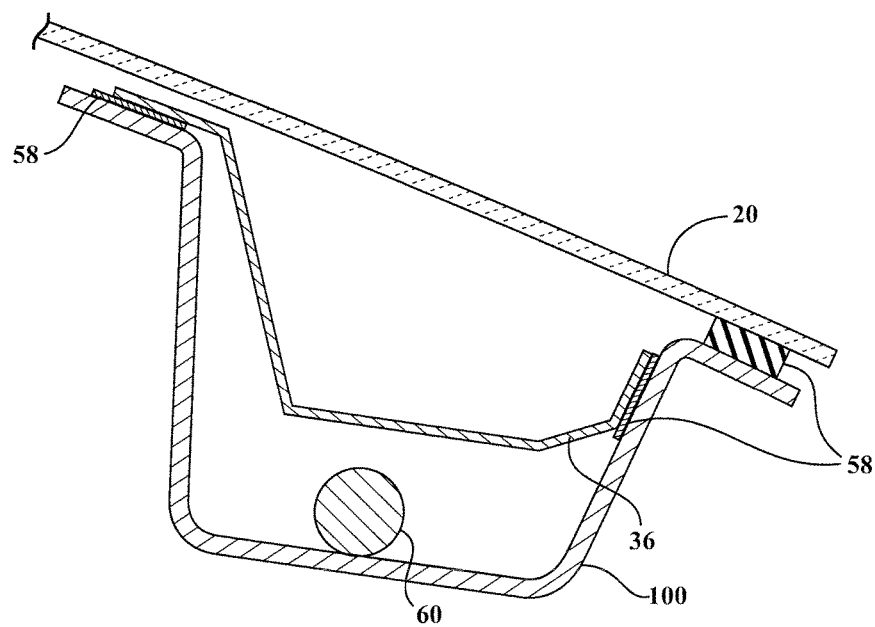
FIG. 6 is an exemplary cross-section of the composite liftgate assembly of FIGS. 5A-5B, in accordance with the present invention.

Referring generally to FIGS. 5A, 5B and 6, an alternative inner panel 100 is shown generally at 100 formed with a channel pattern including a plurality of channels molded into the inner panel 100 to manage the loading paths as the liftgate is utilized in various load cases. Molded into the inner panel 100 is at least one first channel 102 that runs substantially horizontally near the center of the inner panel 100 below the opening 104 for the liftgate window. The at least one first channel 102 is depressed, as in substantially extending inward generally toward the interior of the vehicle. The at least one first channel 102 is formed in at least one second channel 106, where the at least one second channel 106 is raised, as in substantially extending outward generally toward the rear of the vehicle.

Molded into the inner panel 100 is at least one first pair of channels 108 that run in a diagonal pattern at a predetermined angle from near the latch reinforcement 48 horizontal plane upward. The at least one first pair of channels 108 are raised, as in substantially extending outward generally toward the rear of the vehicle.

Molded into the inner panel 100 are additional structural reinforcements such as ribs. A first plurality of ribs 110 are connected to the first pair of channels 108 and run in a substantially diagonal direction generally toward the second channel 106. At least a portion of the first plurality of ribs 110 are connected are connected to the second channel 106.

Molded into the inner panel 100 are a second plurality of ribs 112. The second plurality of ribs 112 are also connected to the first pair of channels 108 and run in a substantially diagonal direction generally toward the lower corner of the inner panel 100.

The inner panel 100 is bonded to the glass pane 20 and reinforcement bracket 36 through the use of adhesive 58 such that predetermined operable cross section(s) for packaging for wiring, e.g., the main wiring harness 60, and an adjacent gas strut is provided. The reinforcement is thin having a predetermined thickness and is bonded, rather than just bolting in a few locations, with structural adhesive to bond in place with continuous attachment of the structure. The inner panel adhered to the brackets and outer panel forms predetermined operable cross sections.

Each of the channels 102,106,108 and ribs 110,112 have predetermined lengths, widths, material thickness, heights and/or depths suitable to provide structural support and strength for the inner panel 100, including under predetermined load conditions. Optionally, additional channels and/or ribs can be formed as part of the inner panel 100. Alternative channel/ribbing patterns are contemplated provided the patterns are suitable to meet the required loading parameters. Having as many appearance surfaces as possible, and/or mold flow of material also correlates to or influences locations of the plurality of channels/ribs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A composite liftgate system, comprising:
   an inner panel formed of a structural thermoplastic composite material;
   an outer panel adhesive bonded to the inner panel, said outer panel having a finished surface;
   at least one first channel that extends horizontally, at least one other channel that extends in a diagonal direction and a plurality of structural reinforcement ribs, at least one of said plurality of structural reinforcement ribs extending from at least one longitudinal side of said at least one other channel, all integrally molded into the inner panel to manage loads applied to the inner panel; and
   at least a pair of steel reinforcement brackets connected by adhesive to the inner panel to add structure and strength to the inner panel;
   wherein the inner panel further comprises at least one second channel, wherein the at least one first channel is located in the at least one second channel; and
   wherein the at least one other channel is at least one first pair of channels that extend diagonally upward in opposite directions.

2. The composite liftgate system of claim 1, wherein the outer panel is two separate pieces comprised of an upper outer panel connected to the inner panel and a lower outer panel connected to the inner panel.

3. The composite liftgate system of claim 2, wherein a spoiler is incorporated with the upper outer panel.

4. The composite liftgate system of claim 1, wherein the at least one first channel extends substantially parallel to and adjacent a rear liftgate window opening formed in the inner panel.

5. The composite liftgate system of claim 1, wherein the at least one second channel and at least one first pair of channels extend outward and the at least one first channel extends inward.

6. The composite liftgate system of claim 1, wherein the plurality of structural reinforcement ribs are spaced apart ribs projecting from both longitudinal sides of each of said channels of said at least one first pair of channels.

7. The composite liftgate system of claim 1, wherein the plurality of structural reinforcement ribs comprise:
   a first plurality of ribs molded into the inner panel and connected to said at least one other channel molded into the inner panel; and
   a second plurality of ribs molded into the inner panel and connected to the opposite side of said at least one other channel.

8. The composite liftgate system of claim 1, wherein the plurality of structural reinforcement ribs further comprise:
   at least one first pair of reinforcement ribs formed in the inner panel extending horizontally and centrally located along the same horizontal plane to one another;
   at least one second pair of reinforcement ribs formed in the inner panel extending in diagonal directions;
   at least one third pair of reinforcement ribs extending in diagonal directions, where each of the ribs of the first pair of reinforcement ribs extend between each rib of the second pair of reinforcement ribs and third pair of reinforcement ribs, respectively.

9. The composite liftgate system of claim 1, further comprising a lower trim panel connected to the inner panel and having a final finished surface.

10. The composite liftgate system of claim 1, wherein the plurality of structural reinforcement ribs are spaced apart ribs projecting from both longitudinal sides of said at least one other channel.

* * * * *